March 19, 1957     C. O. LASSY     2,785,903
TAP CHUCK
Filed Nov. 2, 1953
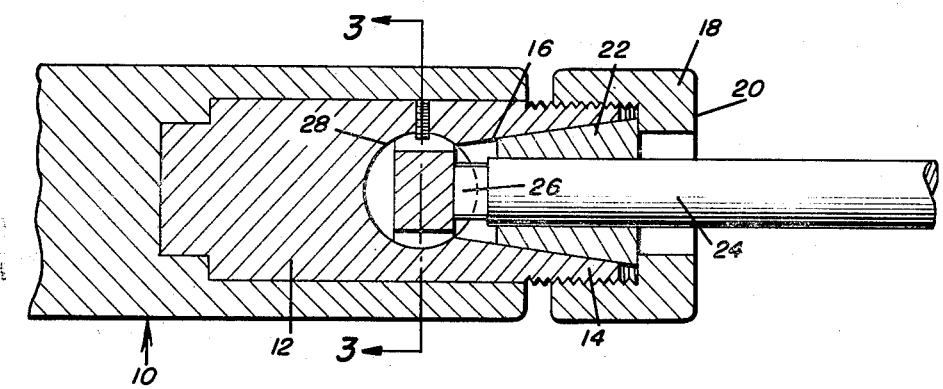
Fig.1
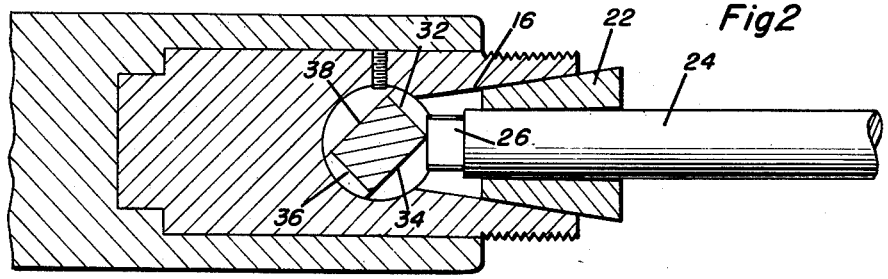
Fig.2
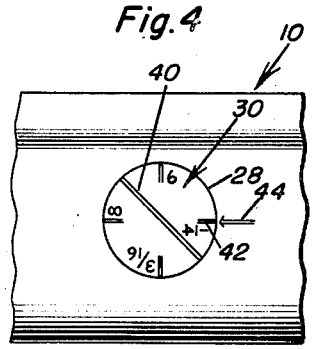
Fig.3
Fig.4
Carl O. Lassy
INVENTOR.
BY United States Patent Office 2,785,903
Patented Mar. 19, 1957

2,785,903

TAP CHUCK

Carl O. Lassy, Plainville, Conn.

Application November 2, 1953, Serial No. 389,513

4 Claims. (Cl. 279—51)

This invention relates generally to tool holding devices and pertains more particularly to an improved form of tapping chuck.

There are at present various types of tap chuck assemblies on the market particularly adapted to solving the problem of set up time by enabling one chuck assembly to be utilized with a large variety of tap sizes, an accomplishment which in the past was unknown, it being necessary to change over to a larger or smaller chuck assembly when changing to a corresponding size of tap. That is, it was frequently necessary to change not only the size of tap being used, but also the chuck assembly for the tap. This problem has been solved to a great extent in a various number of ways, but all of which inherently create other difficulties and problems in themselves. Essentially, these assemblies incorporate a very large diameter chuck assembly, one in which various sized collets may be interchangeably received, it being manifest that the largest size collet must necessarily determine the minimum diameter of the chuck assembly. One outstanding difficulty results from the large diameter necessary in these chucks since they are consequently of rather great weight which, because of modern production techniques involving high speed spindles needing many reversals of spindle rotation manifested with automatic tapping machines, results in undue stress and wear to the tapping machine, reducing its effective life and accuracy.

It is therefore a primary object of this invention to provide an improved tap chuck assembly which is light in weight due to its small diameter yet which is capable of use with a large variety of tap sizes.

Another object of this invention is to provide an improved tap chuck which utilizes a floating drive member which also acts as an ejector element for the tap being held.

These together with other objects and advantages which will become subsequently apparent reside in the details of construction and operation as more fully hereinafter described and claims, reference being had to the accompanying drawings forming a part hereof, wherein like numerals refer to like parts throughout, and in which:

Figure 1 is a sectional view showing the improved tap chuck assembly;

Figure 2 is a view similar to Figure 1 but showing the tap being ejected from the assembly;

Figure 3 is a transverse vertical section taken substantially along the plane of section line 3—3 of Figure 1; and Figure 4 is an elevational view of a portion of the tap chuck assembly.

Referring now more particularly to the drawings, reference numeral 10 indicates the chuck assembly generally and it will be noted that this assembly includes a chuck body member 12 which has a projecting externally threaded end portion 14 and it is further to be noted that the forward end of this body member is provided with a tapered recess 16 substantially in the manner shown. At this point, it may be well to set forth that the taper of the recess 16 is very slight although exaggerated in the drawings and is much less than is ordinarily used in tool holders as will be presently apparent.

A nut member 18 is threaded engaged on the free end of the body member 12 and this nut member is provided with a radially inwardly projecting shoulder or collar portion 20 which is adapted to abut against and engage the larger or outer face of a collet assembly 22 such that when the nut member is tightened the collet will be forced inwardly within the recess 16 so that the round portion of a tap shank 24 will be frictionally engaged and held thereby. The tap shank also is provided with a rectangular reduced end portion 26 in the conventional manner. A transverse bore 28 is provided in the chuck assembly and a combined driving and cam element indicated generally by the reference character 30 is received within this bore in the manner shown. The opposite ends of the driver member are of cylindrical configuration and an intermediate portion of the cam element is provided with transverse slots 32, 34, 36 and 38 of progressively greater width, as will be manifest from a study of Figure 3.

One end of the cam element is provided with a notch 40 for receiving the blade of a screw-driver or the like and this end face is suitably marked with indicia as indicated by the reference character 42 and an index line 44 is provided on the outer surface of the chuck assembly, see particularly Figure 4.

As pointed out above, it is extremely important to bear in mind that the taper of the recess 16 is extremely slight and that the corresponding taper of the collet assembly is of course formed in a similar manner. Because of this, there is very little difference between the diameters at the opposite ends of the collet which will permit various sized internal diameter collets to be utilized in the same recess 16. That is, since the minimum external diameter of the collet governs the maximum internal diameter of the collet, it will be seen that with but a single size of chuck body as disclosed it will be possible to utilize a large variety of sizes of collets within the recess 16, much greater than would be possible if the same size of chuck body were utilized with a conventional collet taper. The effect of this is such that when the nut member 18 is tightened against the collet to force the same into the recess 16, a very tight engagement between the collet and the chuck and the collet and the shank of the tap will be effected. However, when it is desired to remove the tap from the chuck assembly, it is merely necessary to back off on the nut member 18 and insert a screw-driver or other suitable instrument into the slot or notch 40 in the camming element 30 and rotate the same in the manner suggested in Figure 2 which will cam the tap shank outwardly of the chuck assembly and disengage the collet therefrom. This is, of course, effected by the rectangular cross sectional configuration of the intermediate portion of the camming element 30.

Due to the different widths of the various slots 32–38, the large range of sizes of taps which may be utilized with one chuck assembly will merely necessitate the rotation of the camming and driver assembly 30 to the proper position as indicated by the indicia shown in Figure 4 such that the slot selected will correspond to the width of the rectangular end portion of the corresponding tap shank. This is extremely important when it is realized that the member 30 effects the actual rotational drive to the tap and that this driver is in effect a float member which does not impose or impart any strain or deflecting action on the tap shank, the flat end portion thereof being freely received between the opposite sides of the slot being utilized. Thus, the accuracy of centering of the tap member is governed by the accuracy of the recess 16 and collet 22 which may, of course, be extremely accurate.

It will be observed that the change over to a different size tap will also necessitate a change to a different size collet but that at the same time due to the construction of the chuck body member very much larger taps may be utilized in a relatively small diameter and light weight chuck assembly as compared with existing chuck assemblies presently known.

To prevent the combined driver and camming member 30 from falling out of the chuck assembly when a tap is not in the same, a screw-threaded retaining pin 46 may be provided, as will be obvious.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tap chuck construction comprising a tap receiving head having a tapered recess in one end, a collet member received in said recess, means for selectively forcing said collet member inwardly in said recess for frictionally engaging the shank of a tap, said head having a transverse bore communicating with said recess, and a cam member rotatably received in said bore and adapted, upon rotation, to force a tap outwardly of the collet to relieve the aforementioned frictional engagement with a tap, said cam member comprising an elongated element having opposite cylindrical end portions and an intermediate portion of polygonal cross section, said intermediate portion forming a series of abutment surfaces for the shank end face of a tap.

2. A tap chuck construction comprising a tap receiving head having a tapered recess in one end, a collet member received in said recess, means for selectively forcing said collet member inwardly in said recess for frictionally engaging the shank of a tap, said head having a transverse bore communicating with said recess, and a cam member rotatably received in said bore and adapted, upon rotation, to force a tap outwardly of the collet to relieve the aforementioned frictional engagement with a tap, said cam member comprising an elongated element having opposite cylindrical end portions and an intermediate portion of polygonal cross section, said intermediate portion forming a series of abutment surfaces for the shank end face of a tap, a retaining pin removably carried by said head and projecting into its bore.

3. A tap chuck construction comprising a tap receiving head having a tapered recess in one end, a collet member received in said recess, means for selectively forcing said collet member inwardly in said recess for frictionally engaging the shank of a tap, said head having a transverse bore communicating with said recess, and a combined driver and ejector element rotatably received in said bore, said combined element having a series of transverse notches in its intermediate portion adapted to drivingly engage the square shank end of a tap, the cross sectional area of said intermediate portion being polygonal whereby rotation of the combined element will effect longitudinal ejection of a tap.

4. A tap chuck comprising a tap receiving head having a recess in one end, means in said recess for frictionally engaging the shank of a tap, said head having a transverse bore communicating with said recess, and a combined tap driving and ejecting element rotatably mounted in said bore, said tap driving and ejecting element including at least one slot extending transversely of said member and having side and bottom walls adapted to drivingly engage the square shank end of a tap, said bottom wall further serving upon rotation of said element to cam the tap end outwardly for ejection of the tap.

References Cited in the file of this patent

UNITED STATES PATENTS

| | | |
|---|---|---|
| 283,124 | Lorenz | Aug. 14, 1883 |
| 1,037,799 | Schafer | Sept. 3, 1912 |
| 1,050,385 | Palmgren | Jan. 14, 1913 |
| 2,282,674 | Pigott | May 12, 1942 |
| 2,285,101 | Stoner | June 2, 1942 |